(12) United States Patent
Halford

(10) Patent No.: US 7,726,167 B2
(45) Date of Patent: Jun. 1, 2010

(54) TOOLING SYSTEM

(75) Inventor: Ben John Halford, Leicestershire (GB)

(73) Assignee: Surface Generation, Ltd (GB)

( * ) Notice: Subject to any disclaimer, the term of this patent is extended or adjusted under 35 U.S.C. 154(b) by 694 days.

(21) Appl. No.: 10/596,802

(22) PCT Filed: Dec. 23, 2004

(86) PCT No.: PCT/GB2004/005429

§ 371 (c)(1), (2), (4) Date: May 5, 2007

(87) PCT Pub. No.: WO2005/061183

PCT Pub. Date: Jul. 7, 2005

(65) Prior Publication Data

US 2008/0122152 A1 May 29, 2008

(30) Foreign Application Priority Data

Dec. 24, 2003 (GB) ................................. 0329983.1

(51) Int. Cl.
*B21J 13/00* (2006.01)
(52) U.S. Cl. ............................. 72/446; 72/298; 72/442; 72/444; 72/481.3
(58) Field of Classification Search ............... 72/20.1, 72/21.4, 311, 413, 441, 442, 444, 446, 448, 72/455, 456, 462, 473, 481.3, 481.8, 295, 72/298; 294/92
See application file for complete search history.

(56) References Cited

U.S. PATENT DOCUMENTS

| | | | |
|---|---|---|---|
| 2,280,359 A | 4/1942 | Trudell | |
| 3,561,508 A * | 2/1971 | Holzwarth | 81/57.37 |
| 4,098,320 A * | 7/1978 | Kinkopf | 164/407 |
| 4,212,188 A * | 7/1980 | Pinson | 72/413 |
| 5,490,664 A | 2/1996 | Justus et al. | |
| 5,796,620 A * | 8/1998 | Laskowski et al. | 700/197 |
| 6,209,380 B1 | 4/2001 | Papazian et al. | |
| 6,578,399 B1 * | 6/2003 | Haas et al. | 72/57 |

FOREIGN PATENT DOCUMENTS

| | | |
|---|---|---|
| EP | 0 442 036 A | 8/1991 |
| EP | 0 808 555 A | 11/1997 |
| EP | 0 901 876 A | 3/1999 |
| GB | 900654 | 7/1962 |
| RU | 2067374 C | 10/1996 |
| WO | WO 02/064308 A | 8/2002 |

OTHER PUBLICATIONS

International Search Report mailed Jul. 28, 2005, in corresponding International Application No. PCT/GB2004/005429.
Search Report dated Mar. 3, 2004, in corresponding Application No. GB 0329983.1.

* cited by examiner

*Primary Examiner*—Edward Tolan
(74) *Attorney, Agent, or Firm*—Young Law Firm, P.C.

(57) ABSTRACT

A tooling system comprises a plurality of elements (24) arranged in an array, each element being supported on a cross rail (22) and being moveable relative to the other elements in the array. Each element terminates in a threaded support post (25) extending from a first end of the element, and is associated with a corresponding internally threaded aperture in the cross rail upon which the element is supported. The tooling system further comprises an adjusting component in the form of a fork (46) which is driveable in rotation and engageable with an element of the array to drive the element in rotation, upon rotation of the fork.

15 Claims, 4 Drawing Sheets

TOOLING SYSTEM

The present invention relates to an improved component for use in a tooling system, and to an improved tooling system including this component.

The improved component is particularly suitable for use in the tooling systems described and claimed in International Patent Application No. WO 02/064308.

This patent application describes and claims a tooling system comprising a plurality of elements arranged in an array, each element being moveable longitudinally relative to the other elements in the array and having a first end, the system further comprising means to adjust the relative longitudinal positions of the elements such that the free ends of the elements define approximately a desired surface contour and means for retaining the elements in their adjusted positions, characterised in that: the first end of each element is provided on a machinable portion removably mounted to a base portion, the arrangement being such that the free ends of the elements can be machined to produce the desired surface contour.

This patent application further describes and claims a tooling system comprising a plurality of elements arranged in an array, the elements of the array being movable between a closed position in which the elements contact one another and are secured in position, and an open position in which the elements of the array are spaced apart and are capable of vertical movement relative to one another, and drive means for opening and closing the array. The elements are mounted on support rails to form the array.

In International Patent Application No. WO 02/064308, it is taught that the tooling system comprises means to adjust the relative longitudinal positions of the elements of the system.

Two alternative arrangements for adjusting the relative longitudinal positions of the elements are disclosed by way of example in International Patent Application No. WO 02/064308.

In one alternative arrangement, the elements are moved vertically relative to one another by a drive means comprising a downwardly extending threaded rod rotatably mounted to the underside of each element and threadingly engaged in a base portion. The elements are positioned by rotation of the threaded rods, each of which is driven by an electric motor.

In a second alternative arrangement, all of the elements are lifted manually and each element is allowed to fall under gravity to a desired position, when the element is secured.

It is an object of the present invention to provide a further alternative arrangement for moving the elements of an array of this type relative to one another, in order to increase the choice and options available to a user of the system.

It is a further object of the present invention to provide a component for use in this arrangement.

The present invention provides a tooling system which comprises a plurality of elements arranged in an array, each element being supported on a cross rail and being moveable relative to the other elements in the array, characterised in that each element terminates in a threaded support post extending from a first end of the element, and is associated with a corresponding internally threaded aperture in the cross rail upon which the element is supported, and in that the tooling system further comprises an adjusting component in the form of a fork which is driveable in rotation and engageable with an element of the array to drive the element in rotation, upon rotation of the fork.

The radius described by rotation of the fork is preferably less than or equal to the radius of rotation of an element in the array.

In a preferred embodiment of the tooling system according to the invention, the fork comprises a substantially square head portion, from each of the four corners of which square head depends a tine, the tines defining a gripping area corresponding to the area of an element of the array.

In a particularly preferred embodiment of the tooling system according to the invention, the fork comprises an adjustable fork, the tines of which depend from a head portion, the position of which tines can be adjusted relative to each other to define a plurality of differently sized adjustment areas.

In a further preferred embodiment of the tooling system according to the invention, the fork is connected to a driving means for driving the fork in rotation, by means of a flexible coupling.

The present invention further provides an adjusting component in the form of a fork for use in a tooling system of the type described above, which fork comprises a head portion, and a plurality of spaced tines depending from the head portion, each of which tines comprises a first section adjacent to the head portion and having an inwardly facing surface which together with the inwardly facing surfaces of the other tines defines an adjustment area and a second section remote from the head portion and having an inwardly facing guide surface.

The fork preferably comprises a square head portion, from each of the four corners of which depends a tine, each of the four tines comprising a first portion which is substantially triangular in cross-section, leading to a second portion, the inwardly facing surface of which tapers towards the free end of the tine.

The inwardly facing guide surface of the second section of the tine is preferably convex.

At the surface of the head portion from which the tines depend, the inwardly facing surfaces of the first sections of the tines define an adjustment area, the dimensions of which preferably correspond to the dimensions of the associated element of the array.

The first and second sections of the tine each preferably extends along the length of the tine to a distance which is greater than the maximum height variation in the machined surface of an element.

In a preferred embodiment of the fork according to the invention, the square head portion is adjustable in size, so that the tines can be moved relative to one another to define a plurality of differently sized adjustment areas, corresponding to differently sized elements.

The tines of the fork are preferably further adapted to engage with an element of the array in gripping engagement, in order to enable the fork to lift the element after it has been rotated free of the support rail. Where the fork is itself adjustable, this gripping engagement may be effected by moving the tines away from the element and then pivoting them into engagement therewith. Alternatively, the tines may be formed with expandable faces.

The fork according to the invention preferably further comprises one or more sensors, for detecting the position of and measuring the force applied to an element of the array.

In a particularly preferred embodiment of the fork according to the invention, mass is added to the fork in order to increase its driving force.

The fork according to the invention is adapted to receive in driving engagement, a driving means for driving the fork in rotation.

An embodiment of a fork and a tooling system according to the invention will now be described with reference to the accompanying drawings, in which FIG. 1 is a view of a machine layout;

Figure 1:
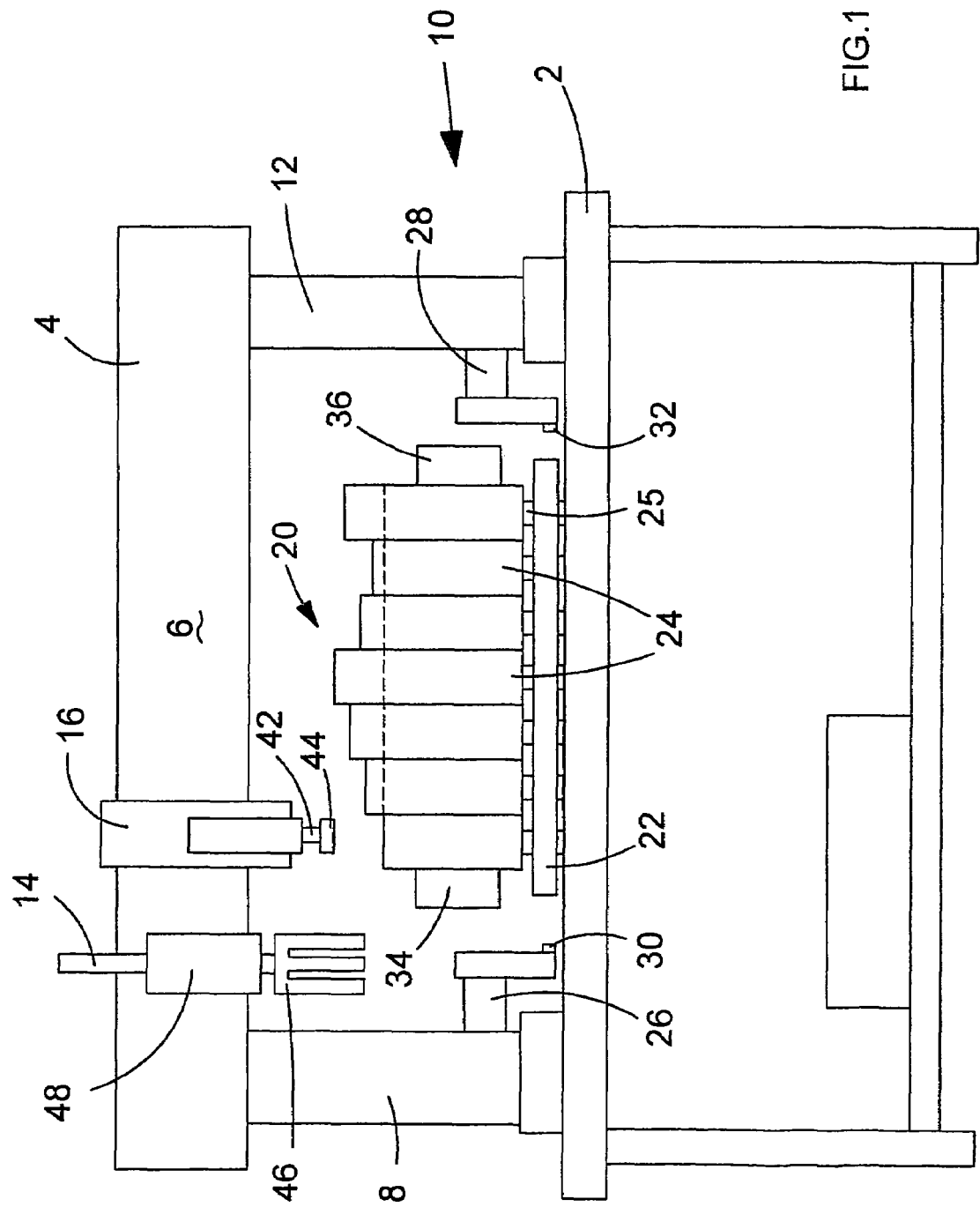

As can be seen from FIG. 1, a tooling system shown generally at 10 comprises a support table 2 on which is located a bridge 4, comprising a horizontal span 6 supported by first and second vertical supports 8,12. The horizontal span 6 supports an adjustment mechanism 14 and a machining tool 16.

The system 10 further comprises a consumable module 20 comprising array elements 24 supported on cross rails 22, which are themselves supported on a chassis (not shown) on the support table 2.

Each of the elements 24 terminates in a threaded support post 25 which engages with an internally threaded aperture (not shown) in the cross rail 22.

First and second side arms 26, 28 extend from the first and second vertical supports 8, 12 respectively, and terminate in retractable pegs 30, 32 adapted to engage with recesses in the ends of the cross rails 22.

Figure 4:
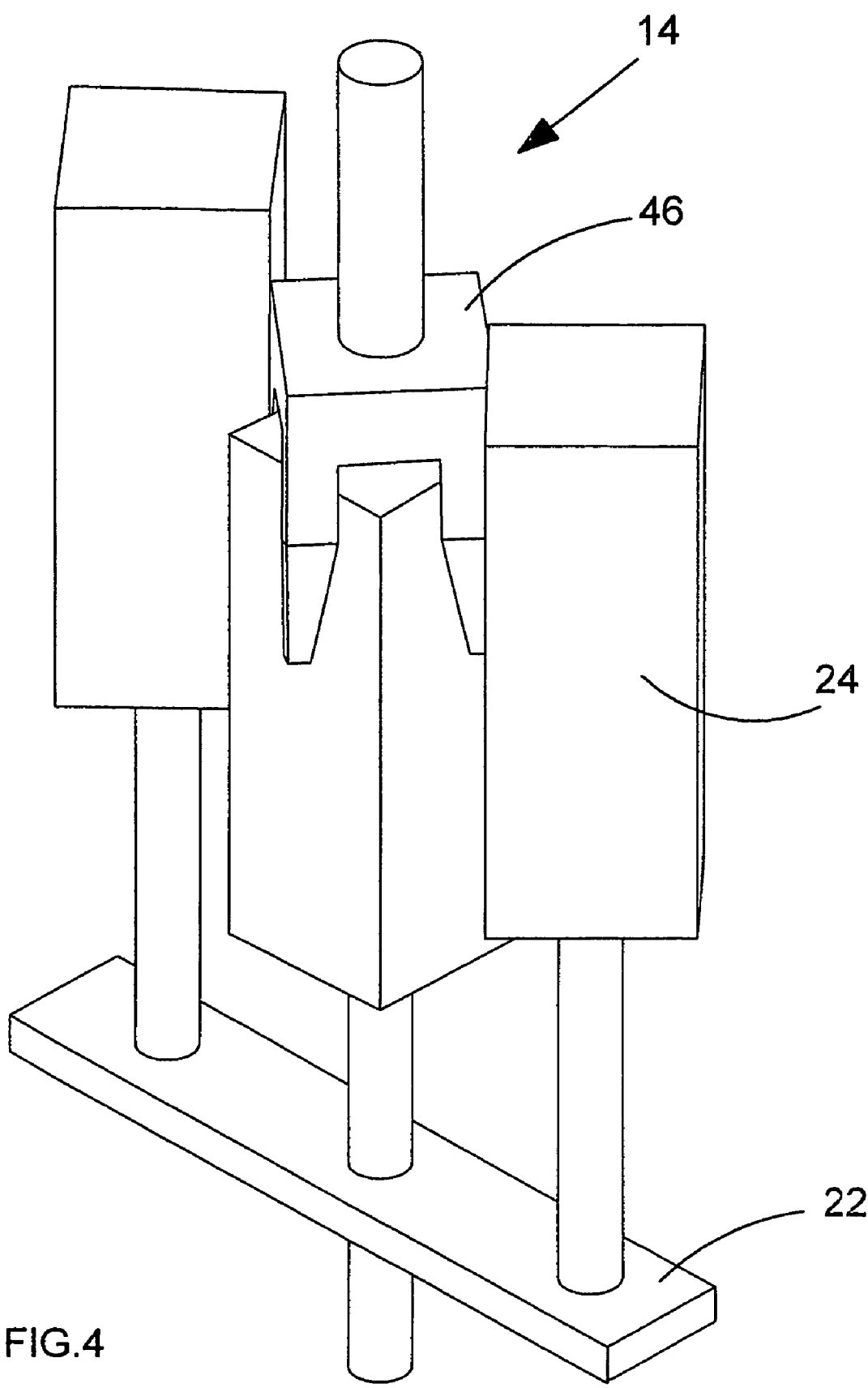
FIG. 4 is a view of the fork of FIGS. 2 and 3 in driving engagement, with an element of the array of FIG. 1.

The elements 24 are arranged in an array, as shown in FIG. 4 and are held in place by four bolsters, two of which are shown at 34 and 36.

The machining tool shown generally at 16 comprises a spindle 42 and a tool head 44 mounted on the spindle 42.

The tool further comprises drive means (not shown) for locating and driving the tool head 44 via the spindle 42.

The adjusting mechanism shown generally at 14 comprises an adjustment fork 46 mounted on a spline and a pneumatic cylinder 48 and provided with a rotating drive (not shown).

Figure 2:
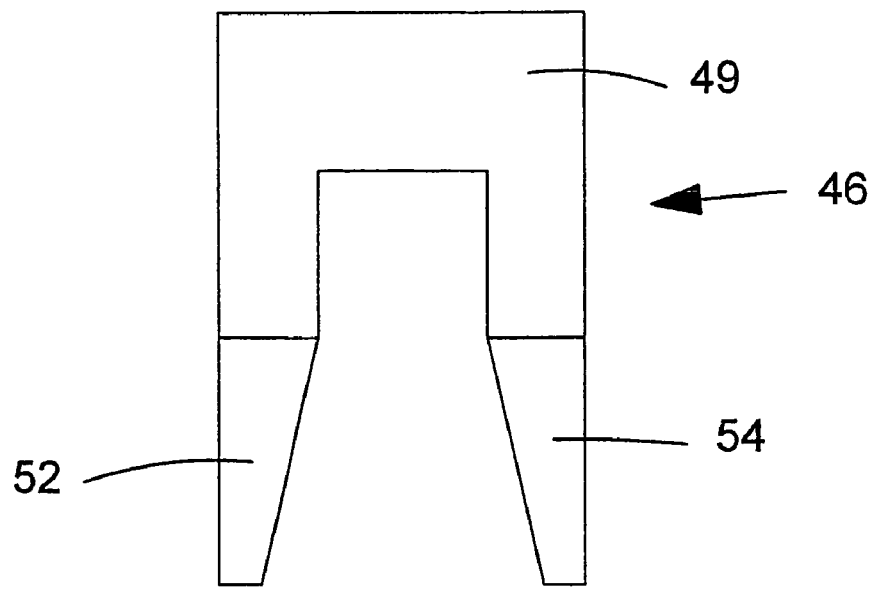
FIG. 2 is a side view of a fork.
Figure 3:
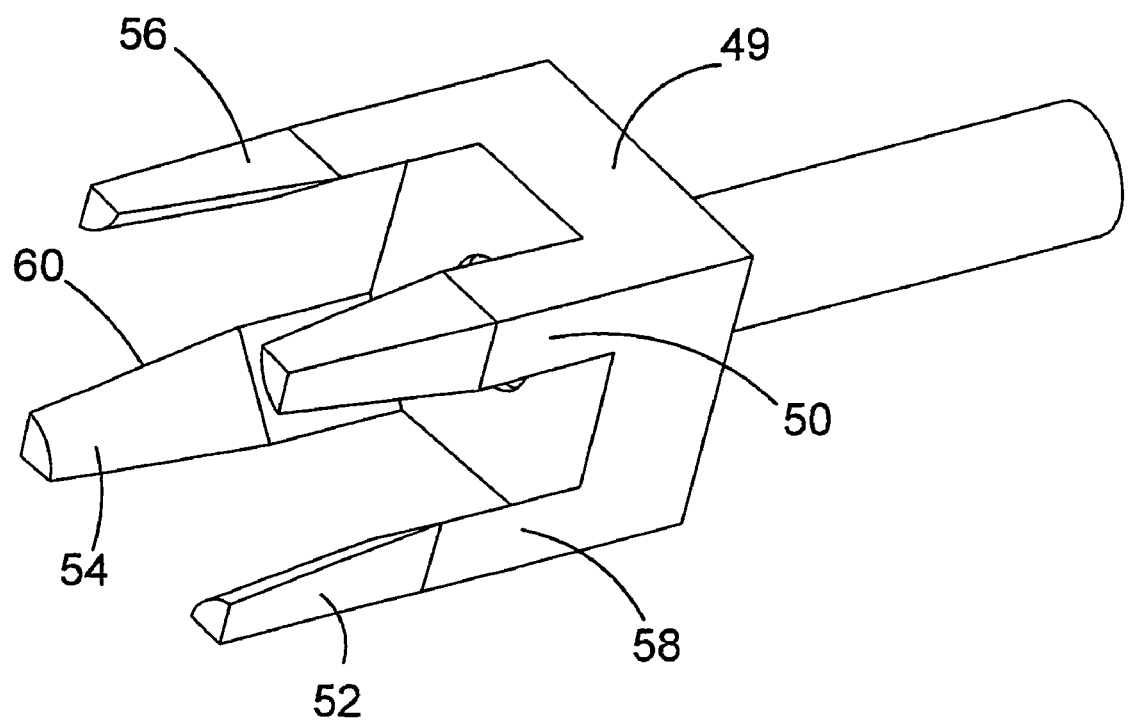
FIG. 3 is a perspective view of the fork of FIG. 2.

As can be seen from FIGS. 2 and 3, the adjustment fork 46 comprises a square head portion 49 from which depend four tines 50, 52, 54 and 56, one tine depending from each of the four corners of the square head portion 49.

As can be seen from FIGS. 2, 3 and 4, each of the tines 50, 52, 54 and 56 comprise a first portion 58 which is substantially triangular in cross-section and which terminates in a tapered portion 60.

The tapered portion 60 provides an inwardly facing guide surface for the element 24. This inwardly facing guide surface has a convex profile.

In use, a target row of array elements 24 is selected and the consumable module 20 is driven, either manually or using a drive system, so that the target row is located parallel to the longitudinal axis of the bridge 4.

A section of the array including a row adjacent to the target row, and all of the rows of the array on the other side of that adjacent row, is separated from the target row, by first driving the bridge 4 into alignment with the adjacent row and then engaging the pegs 30, 32 in the recesses provided in the ends of the cross rail 22 supporting the adjacent row. The bridge 4 can then be used to separate the section from the target row.

The pegs 30, 32 are then retracted from the recesses in the cross rail 22 and the bridge 4 is then driven into alignment with the target row, and the pegs 30, 32 engaged in the recesses of the cross rail 22 supporting the target row. The target row can then be separated from the remaining adjacent row so that the elements of that row can be accessed.

An element within the target row is then selected. The adjustment mechanism 14 is then driven along the bridge 4 so that it is aligned vertically with a first element adjacent to the selected target element. The pressure in the pneumatic cylinder 48 is released and the fork 46 is allowed to fall under its own weight, so that the tines 50, 52, 54, 56 engage the head of the array element 24 in rotary driving engagement. As the fork 46 falls under its own weight, the guide surfaces of the tapered portions 60 operate to correct any misalignment of the array element 24 by rotating it. The adjustment fork 46 is then driven in rotation through 45° and the process is repeated with the second adjacent element.

The adjustment mechanism 14 is then aligned with the selected target element and allowed to engage the target element in a similar manner.

The adjustment fork 46 is then driven in rotation either to raise or lower the array element 24 by rotating it about the axis of its threaded post. When the element 24 has attained the predetermined height and correct angular orientation, the fork 46 is raised out of engagement with the element and is moved so that a next element is located beneath the adjustment fork and the adjustment process repeated until all of the array elements 24 in the line have been adjusted to their predetermined heights. Fine correction of any misalignment of array elements may be carried out by lowering the fork into the open array, and using the external surfaces of the fork to align the array elements.

The tops of the array elements can then be machined as required using the machining tool 16.

Figure 5A:
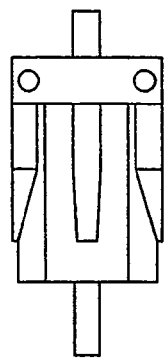
FIGS. 5a-5c are a view of an alternative embodiment of a fork, the size of which can be adjusted.
Figure 5B:
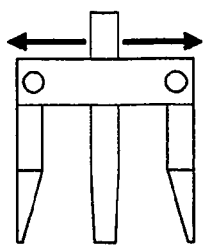
Figure 5C:
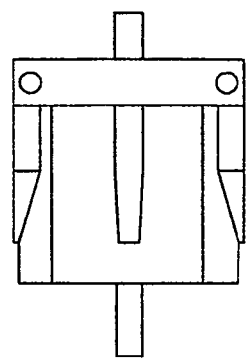
Figure 6:
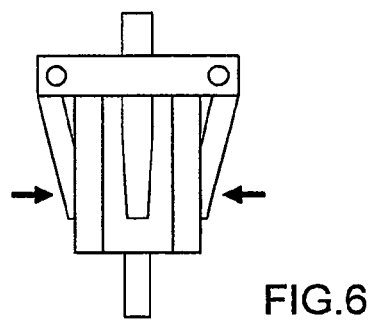
FIG. 6 is a view of the fork of FIG. 5, adjusted for gripping an element of the array

An embodiment of an adjustable fork is shown in FIGS. 5 and 6. The adjustment sequence is shown in FIG. 5, in which FIG. 5(a) shows the tines defining an adjustment area corresponding to a first (smaller) element. The tines are then adjusted through an intermediate position FIG. 5(b) to an extended position FIG. 5(c) where the tines define an adjustment area corresponding to a second (larger) element.

The adjustable fork of FIG. 5 is shown in FIG. 6 in gripping engagement with an element of the array. The tines have been slightly extended away from the element and pivoted to grip the element.

Figure 7:
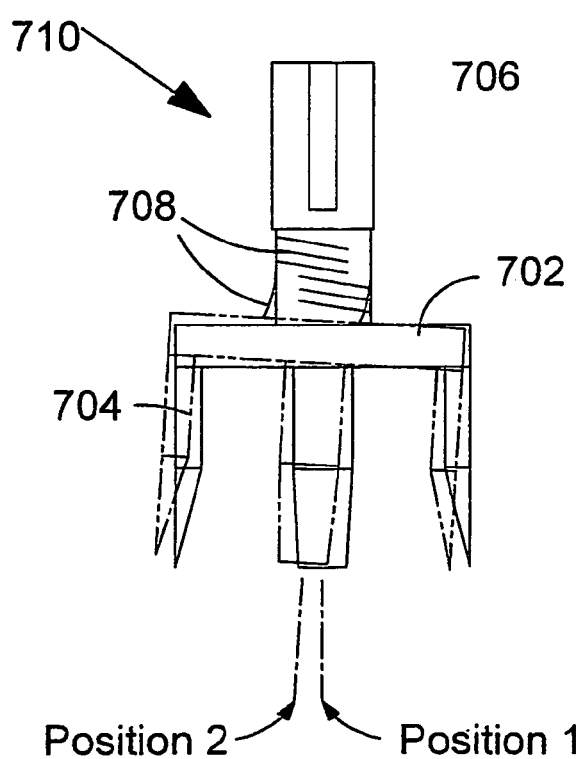
FIG. 7 is a view of a fork according to the invention connected by a flexible coupler.

An alternative means of connecting the fork to the driving means for driving the fork in rotation is shown in FIG. 7.

A fork assembly shown generally at 710 comprises a fork having a head portion 702 from which depend four tines 704. The fork is connected by means of a flexible coupling 708 to a drive shaft 706. The figure shows the fork in two possible positions, Position 1 and Position 2. The fork is naturally in Position 1, depending substantially vertically from the drive shaft 706. As the fork is driven into engagement with an array element (not shown), any relative misalignment between the fork and the array element is compensated for by the flexible coupling 708, which allows the fork to take up a position, by way of example Position 2, in which it is able to engage the array element in gripping engagement.

The further operation of the fork of FIG. 7 is as described above for the alternative embodiments.

It will be appreciate that while a particular alternative position, Position 2, is shown in FIG. 7, this is merely by way of example and the actual position adopted by the fork depends upon the actual relative misalignment.

The invention claimed is:

1. A tooling system which comprises a plurality of elements arranged in an array, each element being supported on a cross rail and being moveable relative to the other elements in the array, wherein each element includes a threaded support post extending from a first end thereof, each said threaded support post being associated with a corresponding internally threaded aperture in the cross rail upon which the element is supported such that each of said elements is rotatable, and wherein the tooling system further comprises an adjusting component in the form of a fork which is driveable in rotation and engageable with an element of the array to drive the element in rotation such that the threaded support post turns in the threaded aperture, upon rotation of the fork.

2. A tooling system according to claim 1, wherein the fork comprises a head portion, and a plurality of spaced tines depending from the head portion, the tines defining an adjustment area corresponding to the area of an element of the array.

3. A tooling system according to claim 2, wherein the fork comprises a substantially square head portion, from each of the four corners of which square head depends a tine, the tines defining an adjustment area corresponding to the area of an element of the array.

4. A tooling system according to claim 1, wherein the fork comprises an adjustable fork, the tines of which depend from a head portion, the position of which tines being adjustable relative to each other to define a plurality of differently sized adjustment areas.

5. A tooling system according to claim 1, wherein a radius described by rotation of the fork is less than or equal to a radius of rotation of an element in the array.

6. A tooling system according to claim 1, further comprising a flexible coupling and a driving means, the flexible coupling being configured to connect the fork to the driving means for driving the fork in rotation.

7. A tooling system according to claim 1, wherein the fork further includes added mass to increase a driving force of the fork.

8. A fork for use in the tooling system of claim 1, wherein the fork comprises a head portion, and a plurality of spaced tines depending from the head portion, each of the plurality of tines comprising a first section adjacent to the head portion and having an inwardly facing surface which together with the inwardly facing surfaces of the other tines defines an adjustment area and a second section remote from the head portion and having an inwardly facing guide surface.

9. A fork according to claim 8, wherein the inwardly facing guide surface of the second section of the tine is convex.

10. A fork according to claim 8, wherein the fork comprises a square head portion, from each of the four corners of which depends a tine, each of the four tines comprising a first section which is substantially triangular in cross-section, leading to a second section an inwardly facing surface of which tapers towards a free end of the tine.

11. A fork as claimed in claim 10, wherein the square head portion is adjustable in size, such that the tines are moveable relative to one another to define a plurality of differently sized adjustment areas, corresponding to differently sized elements.

12. A fork according to claim 8, wherein the tines are adapted to engage with an element of the array in gripping engagement.

13. A fork as claimed in claim 12, further comprising means for moving the tines away from the element and then pivoting them into engagement therewith.

14. A fork as claimed in claim 12, wherein the tines are configured to include expandable faces.

15. A tooling system, the tooling system comprising a plurality of elements arranged in an array, each element being supported on a cross rail and being moveable relative to other elements in the array, wherein each of the plurality of elements terminates in a threaded support post extending from a first end of the element, and each is associated with a corresponding internally threaded aperture in the cross rail upon which the element is supported, the tooling system further comprising an adjusting component in the form of a fork which is driveable in rotation and engageable with an element of the array to drive the element in rotation, upon rotation of the fork, the fork comprising a head portion and a plurality of spaced tines depending from the head portion, each of the plurality of tines comprising a first section adjacent to the head portion and having an inwardly facing surface which, together with the inwardly facing surfaces of the other tines, defines an adjustment area and a second section remote from the head portion and having an inwardly facing guide surface, said fork further comprising at least one sensor configured to detect a position of and measure a force applied to, an element of the array.

\* \* \* \* \*